United States Patent [19]

Keinath et al.

[11] Patent Number: 5,675,136
[45] Date of Patent: Oct. 7, 1997

[54] OPTOELECTRIC DEVICE FOR THE RECOGNITION OF CONTRAST MARKS

[75] Inventors: Armin Keinath, Dettingen; Jörg Wörner, Filderstadt, both of Germany

[73] Assignee: Leuze electronic GmbH + Co., Owen-Teck, Germany

[21] Appl. No.: 556,899

[22] PCT Filed: Mar. 30, 1994

[86] PCT No.: PCT/EP95/00893

§ 371 Date: Nov. 29, 1995

§ 102(e) Date: Nov. 29, 1995

[87] PCT Pub. No.: WO95/27257

PCT Pub. Date: Oct. 12, 1995

[30] Foreign Application Priority Data

Mar. 30, 1994 [DE] Germany ............. 44 11 023.5

[51] Int. Cl.$^6$ ........................ G06K 7/10
[52] U.S. Cl. ........................ 235/462; 235/454
[58] Field of Search ............ 235/462, 472, 235/467, 463, 454, 470, 469, 446; 382/101

[56] References Cited

U.S. PATENT DOCUMENTS

| 4,323,772 | 4/1982 | Serge ............... 235/463 |
| 4,998,010 | 3/1991 | Chandler et al. ...... 235/464 X |
| 5,442,164 | 8/1995 | Adachi ............... 235/462 |
| 5,563,955 | 10/1996 | Bass et al. .......... 235/463 X |

FOREIGN PATENT DOCUMENTS 0 223 131 5/1987 European Pat. Off. .
0 433 593 6/1991 European Pat. Off. .

OTHER PUBLICATIONS

Trakhtman, V.A., "Discrete Matched Filter for Signals in the Form of Walsh Functions" vol. 27/28, No. 10, Oct. 10, 1974; pp. 90–93.

IBM Technical Disclosure Bulletin, "Facet Dependant Digital Filter", vol. 23, No. 3, Aug. 1981, p. 1428.

Finn, W.J., "LSI Hardware Implements Signal Processing Algorithms", vol. 19, No. 3, Mar. 1980, Concord, pp. 137–142.

Proceedings of the 1988 IEEE International Conference on Systems, Man, and Cybernetics, "Edge Detection with Matched Filters", CAI, Shixue et al., vol. 2, Aug. 1988 Beijing & Shenyang, China, pp. 901–905, XP000106255.

Primary Examiner—Donald T. Hajec
Assistant Examiner—Thien Minh Le
Attorney, Agent, or Firm—Spencer & Frank

[57] ABSTRACT

An optoelectronic device for recognizing marks provided with defined contrast patterns includes a transmitting element that transmits a light beam and a receiving element. The beam of transmitted light is guided across the marks, and the received beam of light reflected from a mark exhibits an amplitude modulation which is impressed by the contrast of the mark and is dependent on the spatial course of intensity of the transmitted light beam. The received light in the receiving element is converted into an analog received signal. The analog received signal is converted, in an n-bit analog/digital converter, into a digital received signal which is supplied to a digital filter whose transmission characteristic is essentially equivalent to the inverse of the frequency spectrum of the spatial distribution of intensity of the transmitted light beam at the location of the mark.

16 Claims, 7 Drawing Sheets

A device of this type is known from EP 0 433 593 A2. The device is embodied as a bar code reader for scanning bar code symbols.

OPTOELECTRIC DEVICE FOR THE RECOGNITION OF CONTRAST MARKS

BACKGROUND OF THE INVENTION

The invention relates to an optoelectronic device for recognizing a mark having a defined contrast pattern wherein the device includes a transmitting element for emitting a beam of light that is passed over the mark and a receiving element for receiving a received beam of light reflected from the mark and producing an analog received signal which exhibits an amplitude modulation dependent on the contrast pattern of the mark. The invention further relates to a method of reducing signal distortion for an optoelectronic device of the above type.

A device of this type is known from EP 0 433 593 A2. The device is embodied as a bar code reader for scanning bar code symbols.

The bar code symbols comprise a succession of light and dark line elements of predetermined width. The bar code symbols are scanned by the device by means of a transmitted light beam, preferably a laser beam. The transmitted light beam has a mean diameter corresponding to its spatial distribution of intensity perpendicular to the direction of propagation. In laser beams, the spatial distribution of intensity ideally corresponds to a Gaussian distribution.

The diameter of the transmitted light beam varies with the distance from the device, depending on the transmitting lens preceding the transmitting element. In the focal plane of the transmitted light beam, the diameter of the transmitted light beam is typically considerably smaller than the width of the line elements. Consequently, the amplitude modulation of the received signal is virtually identical to the widths of the line elements of the bar code symbol, so that the symbol can be reliably recognized by the device.

As the distance between the bar code symbol and the focal plane of the transmitted light beam increases, the diameter of the transmitted light beam rapidly increases. As soon as the diameter of the transmitted light beam is of the same order of magnitude as the widths of the line elements of the bar code symbols, the modulation of the received signal is influenced by the width of the transmitted light beam such that reliable detection of the bar code symbol is impeded or is no longer possible.

As described in EP 0 433 593 A2, as the diameter of the transmitted light beam increases, the high-frequency components of the modulated received signal, which derive from the narrow line elements of the bar code symbol, are increasingly suppressed.

If the amplitudes of the high-frequency components of the received signal are too strongly suppressed in proportion to the amplitudes of the low-frequency components of the received signal, the bar code symbol can no longer be read by the device.

To compensate for this effect, the device of EP 0 433 593 A2 is provided with an analog filter, with which the analog received signal is filtered such that the high-frequency components are amplified to a greater degree than the low-frequency components.

Four frequencies, $f_0$, $f_1$, $f_2$ and $f_3$, are defined for the purpose of determining the transmission characteristic of the filter.

In each of the regions between two adjacent frequencies, one specific amplification factor is chosen, and the amplification factors become greater as the frequency increases. For a certain diameter of the transmitted light beam, the transmission characteristic of the filter can be permanently set. Alternatively, the transmission function of the filter can be altered by shifting the frequencies $f_0$, $f_1$, $f_2$ and $f_3$.

This shift is suitably done as a function of the frequency that corresponds to the narrow line elements of the bar code symbol.

One substantial disadvantage of this device resides in the coarse graduation of the frequency spectrum of the received signal. As a result, the influence of the transmitted light beam diameter on the modulation of the received signal can be detected only incompletely. Hence the received signal can only be optimized to a limited extent by means of the analog filter.

Another disadvantage of this device is that the transmission function of the analog filter can be optimized only for a specific distance. At various reading distances, the frequencies $f_0$, $f_1$, $f_2$ and $f_3$ must be varied, and the change in the frequencies is done by means of an additional sensor system, which by way of example measures the signal frequencies of the received signals deriving from the narrow lines. This entails considerable additional expense for circuitry.

SUMMARY OF THE INVENTION

An object of the invention is to configure a device and a method of the type referred to at the outset such that the marks can be reliably recognized within a wide reading range.

The above and other objects are accomplished in accordance with the invention by the provision of an optoelectronic device for recognizing a mark having a defined contrast pattern, comprising: a transmitting element for emitting a beam of transmitted light that is passed over the mark, the emitted light beam having a spatial distribution of intensity and a corresponding frequency spectrum at a location of the mark; a receiving element for receiving a received beam of light reflected from the mark and producing an analog received signal which exhibits an amplitude modulation dependent on the contrast pattern of the mark and on the spatial distribution of intensity of the transmitted light beam at the location of the mark; an n-bit analog-to-digital converter having a word width (n) greater than one connected to the receiving element for receiving the analog received signal and converting the analog received signal into a digital received signal; and a digital filter connected to the n-bit analog-to-digital converter for receiving the digital received signal and having a transmission characteristic which is essentially equivalent to an inverse of a frequency spectrum of the spatial distribution of intensity of the transmitted light beam at the location of the mark for outputting a digital signal that has transition points corresponding to transition points in the contrast pattern of the mark.

The objects of the invention are further carried out by the provision of a method for reducing signal distortion for the above optoelectronic device, comprising: modeling the total system of the optoelectronic device including the frequency spectrum of the spatial distribution of intensity of the transmitted light beam and the transmission function of signal-distorting components and of the digital filter; experimentally determining a decoding reliability of the device as a function of a reading distance d of the mark from the device for a specific presetting of the digital filter, wherein the decoding reliability is the degree of matching of amplitude modulation of the received signal with the contrast pattern of mark; and varying adjustable coefficients of the digital filter at a predetermined transmission function of the signal-distorting components and at a predetermined frequency spectrum of the spatial distribution of intensity of the transmitted light beam until the decoding reliability has exceeded a predetermined threshold value.

The basic concept of the invention is to detect systematically and completely the interference in the received signal that is caused in particular by the receiving element and by the finite diameter of the transmitted light beam, and to compensate for the interference by means of the digital filter.

To that end, the receiving element is followed by an n-bit analog/digital converter, which converts the analog received signal into a digital signal. The resolution of the analog/digital converter, or in other words its word width, should suitably be chosen to be as high as possible. In this way a loss of information upon the conversion of the analog signal into a digital signal is largely avoided.

Compensating for the distortions in the received signal is done by means of a suitable choice of the transmission function of the digital filter to which the digitized received signal is supplied.

In the determination of the transmission function of the digital filter, the transmission functions of the signal-distorting components, especially of the receiving element, and the frequency spectrum of the spatial distribution of intensity of the transmitted light beam are taken into account. As a result, the interfering factors can be detected accurately and compensated for over the entire frequency range, and as a result the Geometry of the light and dark surfaces of the marks can be reconstructed very precisely from the course of the amplitude of the received signal.

In the method of the invention, the adjustable coefficients of the digital filter are obtained via a suitably computer-controlled variation process. In this process, the variation of the coefficients of the filter is performed until the received signal, within a predetermined accuracy, matches the actual contrast pattern of the marks.

The variation of the coefficients of the digital filter can be done for a predetermined reading distance of the marks from the device and for a predetermined contrast pattern of a mark.

In an especially advantageous embodiment of the invention, the variation of the coefficients of the digital filter is done for a predetermined range of the reading distance. The variation is additionally expanded to different contrast patterns of the marks.

As a result, it is attained that various marks can not only be recognized reliably at a single reading distance but also within an expanded reading range. This considerably increases the availability of the device without increasing the expenditure for circuitry.

In a further advantageous embodiment of the invention, the transmission functions of the receiving element, or possibly of further signal-distorting components, are predetermined within a predetermined bandwidth in the variation of the coefficients of the signal-distorting components.

These bandwidths suitably correspond to the deviations from one component to another. In this way, the variation of the coefficients of the digital filter need not be done individually for each device but rather only once for an entire series of devices.

In this way the expenditure for testing and adjusting the device is reduced considerably, and hence the costs expended for the device can be reduced.

BRIEF DESCRIPTION OF THE DRAWINGS

The invention will be described below in conjunction with the drawings.

DETAILED DESCRIPTION OF THE PREFERRED EMBODIMENT

Figure 1:
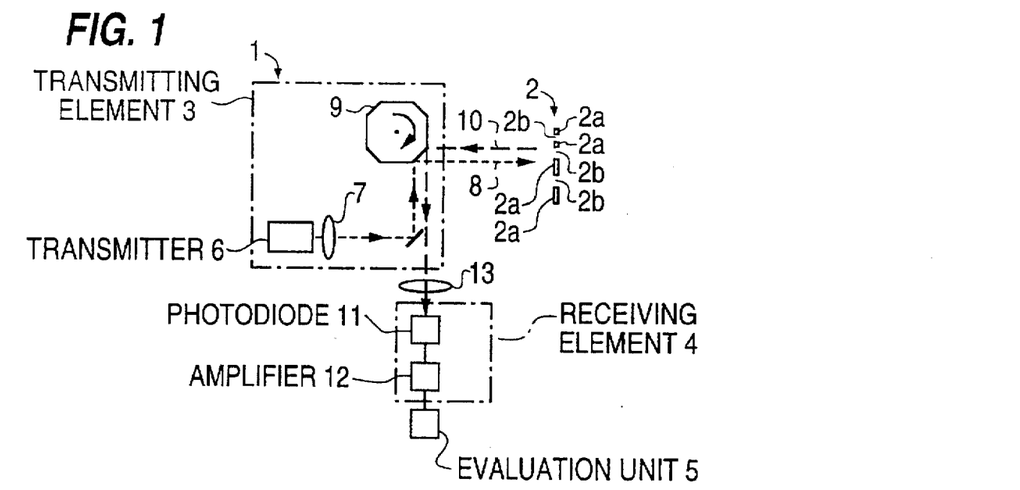
FIG. 1 is a schematic and block diagram showing a basic layout of an optoelectronic device according to the invention.

In FIG. 1, the basic layout of an optoelectronic device 1 for detecting marks provided with defined contrast patterns is shown. In principle, the marks may have arbitrary sequences and shapes of light and dark surfaces adjacent to one another, preferably black and white surfaces. The invention will be described below for the case where the marks are formed by bar code symbols 2. The bar code symbols 2 essentially comprise a succession of black and white line elements 2a, b of defined length and width.

The optoelectronic device 1 substantially comprises a transmitting element 3, a receiving element 4, and an evaluation unit 5. The transmitting element 3 comprises a transmitter 6, preferably a laser diode, and a transmitting lens 7, preceding the emitter 6, for focusing the transmitted light beam 8. The focused transmitted light beam 8 is deflected via a deflector unit 9, which in the present exemplary embodiment is formed by a rotating polygonal mirror wheel, and guided across the bar code symbol 2 to be detected. The axis of rotation of the polygonal mirror wheel is perpendicular to the equatorial plane of the polygonal mirror wheel shown in FIG. 1.

The received light 10 reflected by the bar code symbol 2 is guided to the receiving element 4 via the polygonal mirror wheel. The receiving element 4 comprises a photodiode 11, in which the received light 10 is converted into an electronic received signal, and an amplifier 12 that follows the diode. To improve the sensitivity of detection, a receiving lens 13 precedes the receiving element 4.

The received signal present at the output of the receiving element 4 is fed to the evaluation unit 5.

Figure 3A:
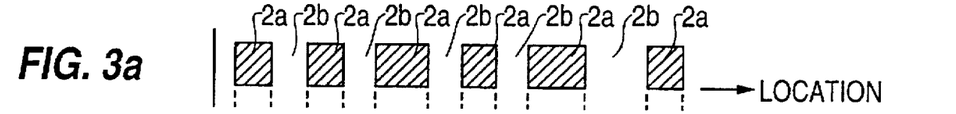
FIG. 3a illustrates a bar code symbol.
Figure 3B:
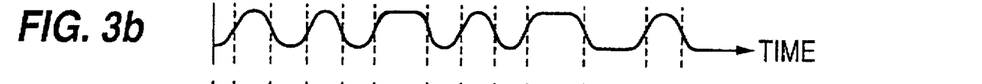
FIG. 3b is a pulse diagram showing the received signal at the input of the threshold value unit.

The principle by which the received signals are evaluated can be seen from FIGS. 3a–3d. FIG. 3a shows a bar code symbol 2 with a succession of black and white line elements 2a, b. In the event that the diameter of the transmitted light beam 8 on the bar code symbol 2 is substantially smaller than the smallest width of one line element 2a, b, the transmitted light beam 8 is amplitude-modulated, as shown in FIG. 3b, by the reflection from the bar code symbol 2.

In the event that no distortions or skewings of the received signal take place in the receiving element 4, the curve course shown in FIG. 3b corresponds to the received signal present at the output of the receiving element 4.

The determination of the width of the individual line elements 2a, b of the bar code symbol 2 in the evaluation unit 5 is suitably done by the turning point process.

Figure 3C:
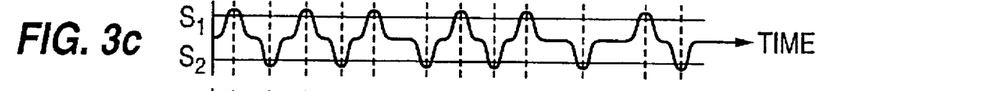
FIG. 3c is a pulse diagram showing a differentiated received signal.

In a first step, the received signal is differentiated (FIG. 3c). Next, the extremes of the differentiated received signal are determined which correspond to the turning points of the received signal. These turning points in turn define the transitions from a black to a white line element 2a, b and vice versa.

Figure 3D:
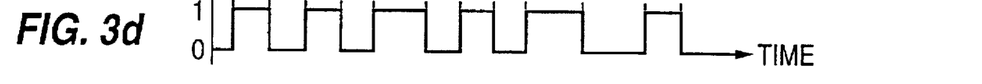
FIG. 3d is a pulse diagram showing the binary received signal train at the output of the threshold value unit.

To determine the turning points of the received signal, the differentiated received signal is converted, with preferably two switching thresholds $S_1$ and $S_2$ (FIG. 3c) into a binary signal train (FIG. 3d). The duration of the states "0" and "1" of the binary signal train is a measure for the width of the line elements 2a, b of the bar code symbol 2. The duration of the states "0" and "1" can be detected in a simple way via a clock-controlled counter.

As the diameter of the transmitted light beam 8 becomes greater or with increasing signal distortions in the receiving element 4, the edge errors also become greater; that is, the turning points of the received signal no longer coincide with the location coordinates of the black-white transitions of the bar code symbol 2. In an extreme case, this means that a bar code symbol 2 can no longer be recognized.

One measure for the deviation of the received signal from the actual contrast pattern is known as the decoding reliability DS.

In an ideal bar code reader without signal-distorting components and with an infinitely sharply focused transmitted light beam 8, there is a perfect match between the locations of the turning points of the received signal and the locations of the black-white transitions of the bar code symbol 2. This corresponds to the value DS=1. A bar code symbol 2 can be recognized reliably by the device 1.

As the disturbing influences become greater, the differences between the locations of the turning points of the received signal and the locations of the black-white transitions of the bar code symbol 2 become greater; that is, the decoding reliability DS becomes lower.

In an actual bar code reader, the component-dictated disturbing influences or the diameter of the transmitted light beam 8 can be so great that line elements 2a, b of the bar code symbol 2 with different width ratios result in a received signal with equidistant turning points. In this case, line elements 2a, b of different width can no longer be recognized. The decoding reliability in this case is DS=0.

Figure 2:
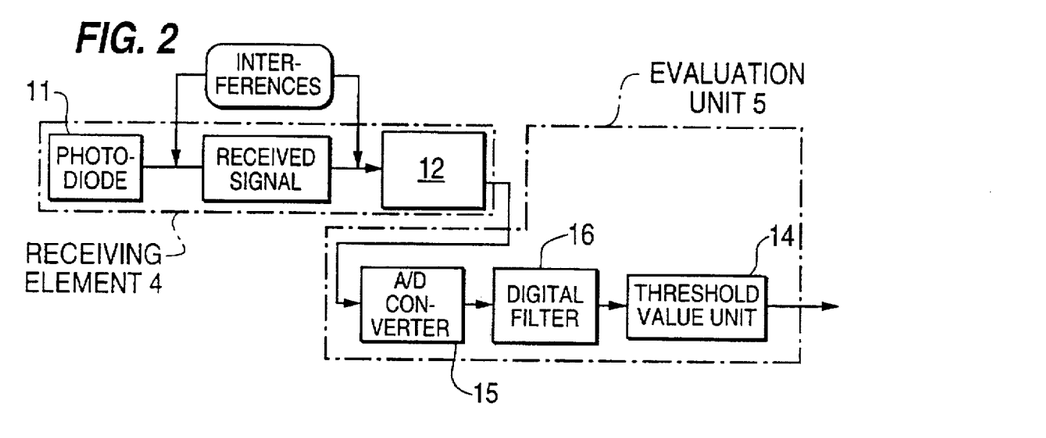
FIG. 2 is a block circuit diagram of the evaluation unit of the optoelectronic device of FIG. 1.

Referring to FIG. 2, to eliminate these signal distortions, or in other words to increase a decoding reliability, a threshold value unit 14 is preceded in the evaluation unit 5 by an n-bit analog/digital converter 15 and a digital filter 16.

The n-bit analog/digital converter 15 has a word width in a range of n=8 to 12. In the present exemplary embodiment, a 10-bit analog/digital converter 15 is used. As a result, the analog received signal can be converted with high resolution into a digitized received signal.

Figure 4:
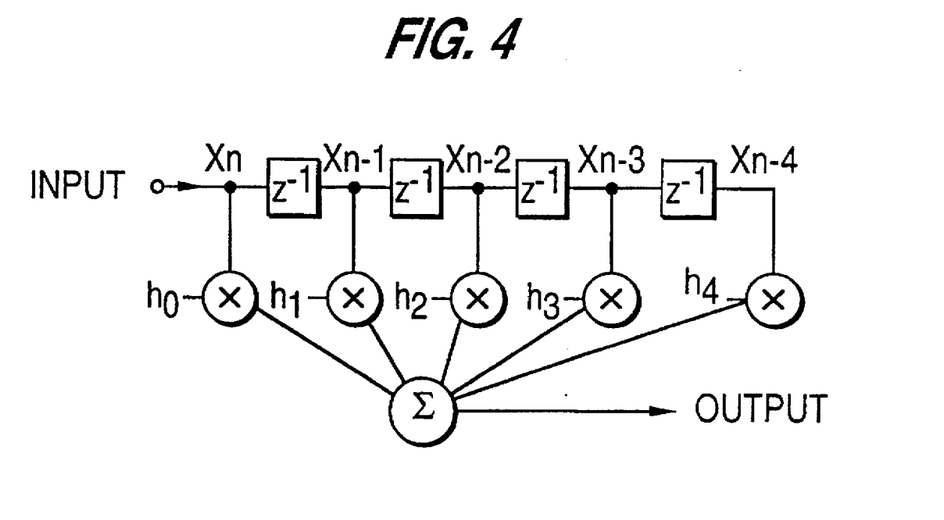
FIG. 4 is a block circuit diagram of a FIR filter.

The digital filter 16 is formed by a nonrecursive FIR filter. The basic layout of an FIR filter is shown in FIG. 4. An output variable $y_n$ of the FIR filter depends on the input variable $x_m$ (m=n, n−1, n−2, . . . , n−M) at various times m.

$$Y_s = \sum_{m=0}^{M} h_m x_{n-m}$$

The variable z shown in FIG. 4 is the variable in the frequency range that is conjugated with the time variable n. The variable $z^{-1}$ represents the amount of the delay between two linking points, such as $x_n$ and $x_{n-1}$. The symbols x and $\Sigma$ characterize a multiplicative and additive linking, respectively.

The weighting of the input variables $x_m$ is done with adjustable coefficients $h_m$. The number of coefficients $h_m$ determines the degree of the filter. In the present exemplary embodiment, an eighteenth degree FIR filter is used.

The digitized and filtered received signal is delivered to the threshold value unit 14, where it is converted into a binary signal train.

According to the invention, the transmission function of the digital filter 16 is embodied such that signal distortions in the received signal which are due to components or to the finite diameter of the transmitted light beam 8 can be eliminated.

These interfering variables are not constants, however, but instead depend on several external factors. The influence of the diameter of the transmitted beam 8 on the decoding reliability depends on the ratio between the diameter of the transmitted light beam 8 and the widths of the line elements 2a, b of the bar code symbol 2. The diameter of the transmitted light beam 8 also depends on the distance d between the bar code symbol 2 and the device 1. Finally, the embodiment of the signal-distorting components affects the magnitude of the interfering signals.

Figure 5:
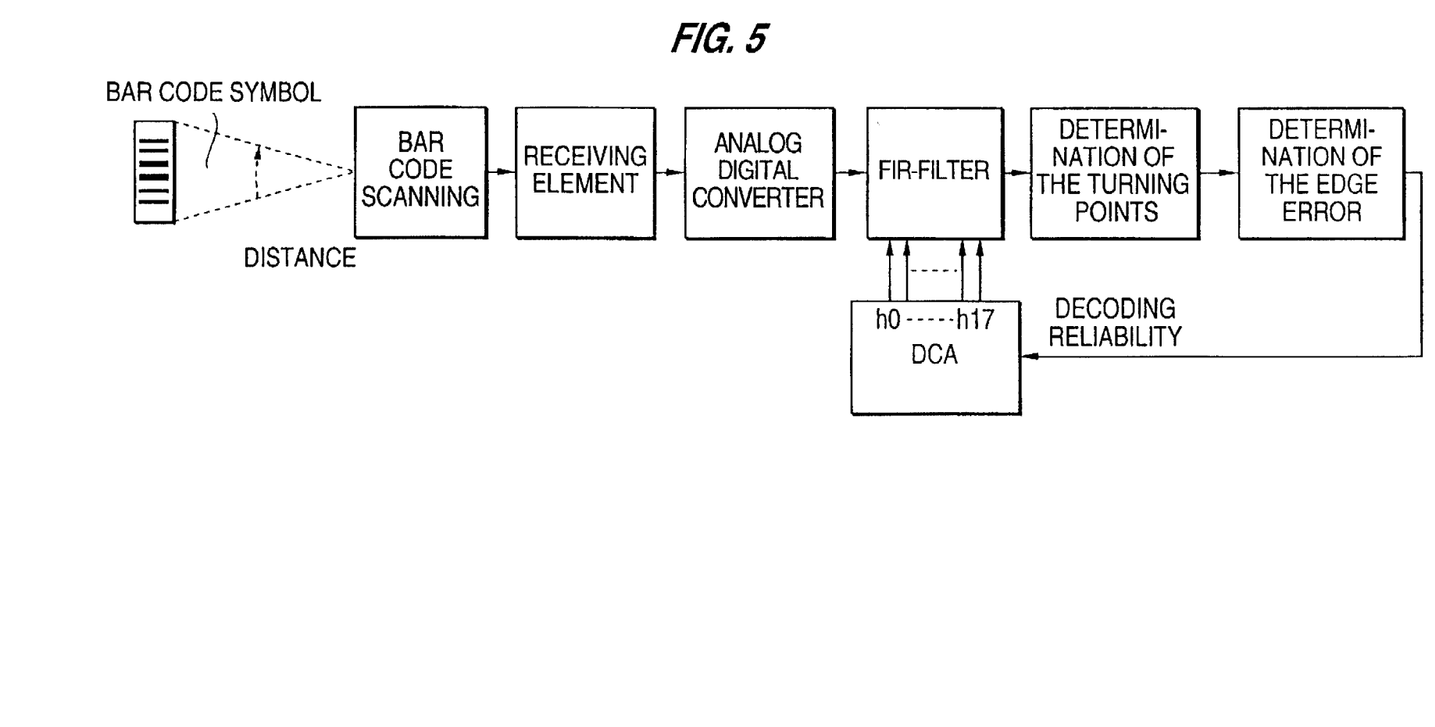
FIG. 5 is a flowchart for determining the coefficients of the digital filter of FIG. 4.

In the determination of the coefficients $h_m$ of the digital filter 16, these influencing variables are taken into account according to the invention in the context of a total model for the device 1. On the basis of this total model, the coefficients are ascertained via systematic variation. A flow chart for determining the coefficients $h_m$ of the digital filter 16 is shown in FIG. 5.

The bar code reader is connected to a computer unit, not shown, and at predetermined distances d detects bar code symbols 2 that have line elements 2a, b of defined width ratios.

The received light 10 that as a result of the scanning of the bar code symbol 2 strikes the receiving element 4 is converted there into the received signal. This received signal has signal distortions, which are caused by the receiving element 4 and by the finite diameter of the transmitted light beam 8.

As a result, the received signal includes not only information about how the bar code symbol 2 that has been scanned is embodied, but also information about the transmitted light beam 8 and the receiving element 4. This received signal is digitized in the analog/digital converter 15 and supplied to the FIR filter and finally to the computer unit (not shown). In addition, the contrast pattern of the bar code symbol 2 is stored in the computer unit.

In the computer unit, the locations of the turning points of the received signal are ascertained and compared with the positions of the transitions from black to white line elements 2a, b. From the deviation between these positions, the decoding reliability of the device 1 is ascertained.

Figure 9:
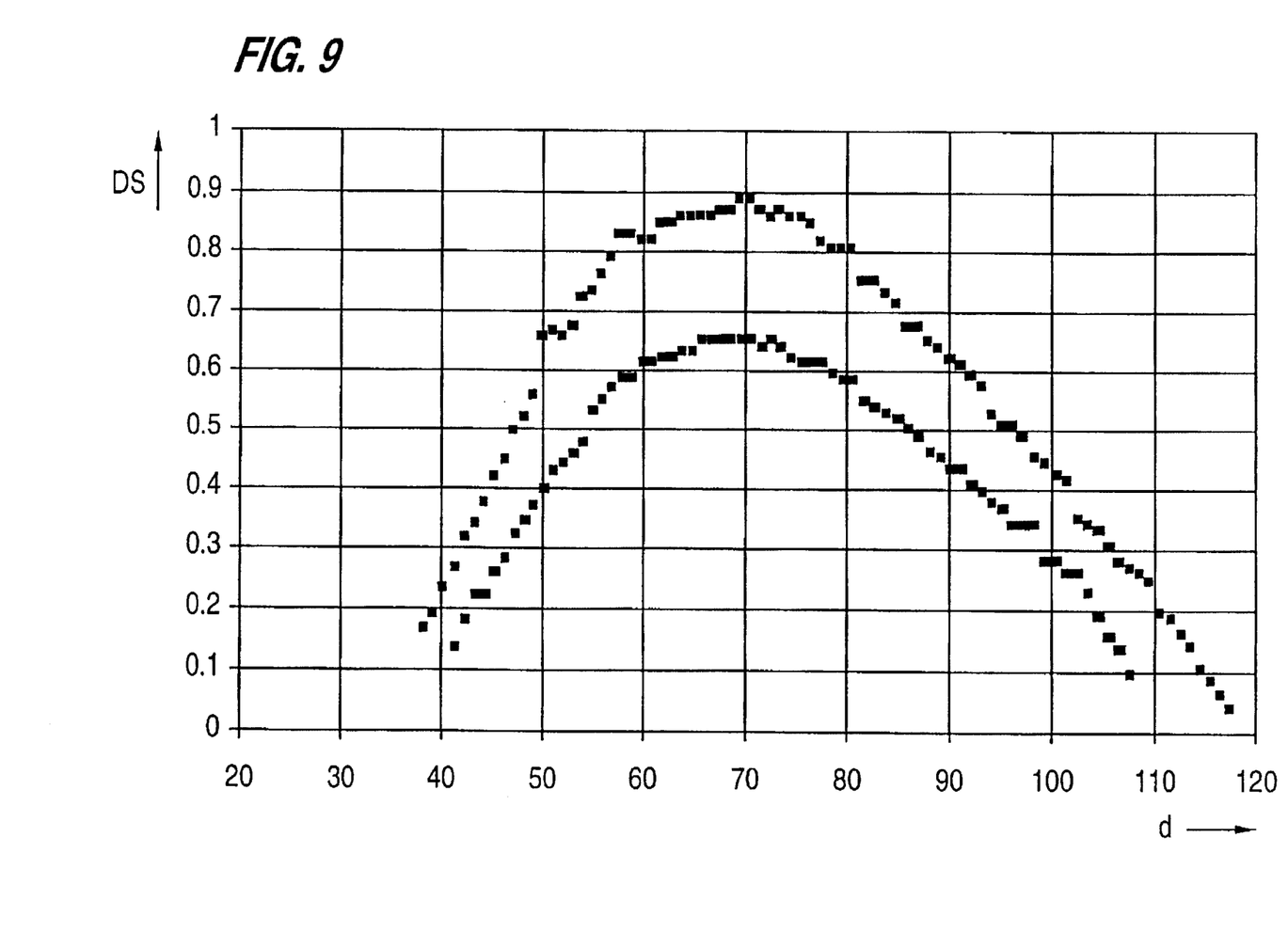
FIG. 9 is a graph showing decoding reliability of the device with and without an optimized digital filter.

This process is repeated for different reading distances, so that the decoding reliability is present in the computer unit as a function of the reading distance d. One example of the thus-ascertained decoding reliability as a function of the reading distance is shown in FIG. 9 (lower curve).

The coefficients $h_m$ of the filter 16 are adjusted to predetermined values, which form the starting condition for the ensuing variation process. As the starting position, the value of one of the coefficients $h_m$ of the filter 16 is suitably set to 1, while the remaining coefficients $h_m$ assume the value 0.

The variation of the coefficients $h_m$ of the FIR filter is done in the computer unit by the design centering method (design centering analysis=DCA). The decoding reliability ascertained beforehand as a function of the distance d is used as the input variable. With this information, the coefficients $h_m$ of the FIR filter are varied according to the principle of random distribution. Then the sets of parameters that lead to a decoding reliability that exceeds a predetermined minimum value are stored.

Figure 6:
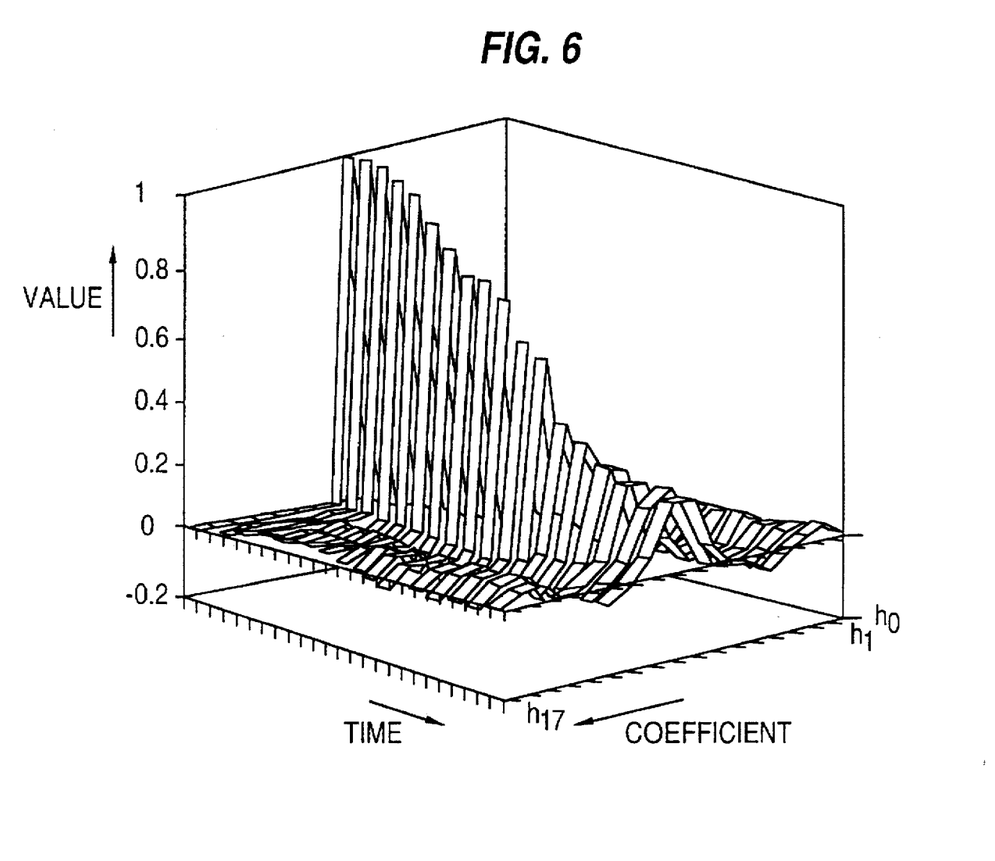
FIG. 6 is a graph showing the time dependency of the coefficients of the digital filter during the variation of the coefficients.

This method is repeated in a plurality of iteration steps in which the decoding reliability ascertained in the computer unit for the previous iteration step is used for the current iteration step. The iteration is halted when the decoding reliability exceeds a predetermined desired value. The variation over time in the coefficients of the FIR filter during the individual iteration steps is shown in FIG. 6.

Suitably, the optimization of the coefficients of the filter is carried out not only for a single reading distance but instead for a predetermined distance range, where the desired value for the decoding reliability must be attained for every reading distance.

In this way, the digital filter 16 can be dimensioned in such a way that the decoding reliability within a predetermined reading distance range is improved. The results of such a variation are shown in FIG. 9 (upper curve). Alternatively, the decoding reliability can be optimized for only a single specific reading distance. In that case, higher decoding reliabilities of virtually DS=1 can be attained, since the decoding reliability needs to be optimized for only one reading distance d.

Different bar code symbols 2 can also be used in the variation.

Finally, instead of an experimental determination, the diameter of the transmitted light beam and the transmission function of the receiving element 4 can be predetermined as model variables in a simulation model.

The coefficients of the digital filter 16 can thus be determined without having to perform an actual scanning of he bar code symbol 2.

It is also advantageous that the transmission function of the receiving element 4 in the total model can be predetermined within a predetermined bandwidth. The influences of variations from one component to another on the decoding reliability can thus be compensated for.

Figure 7:
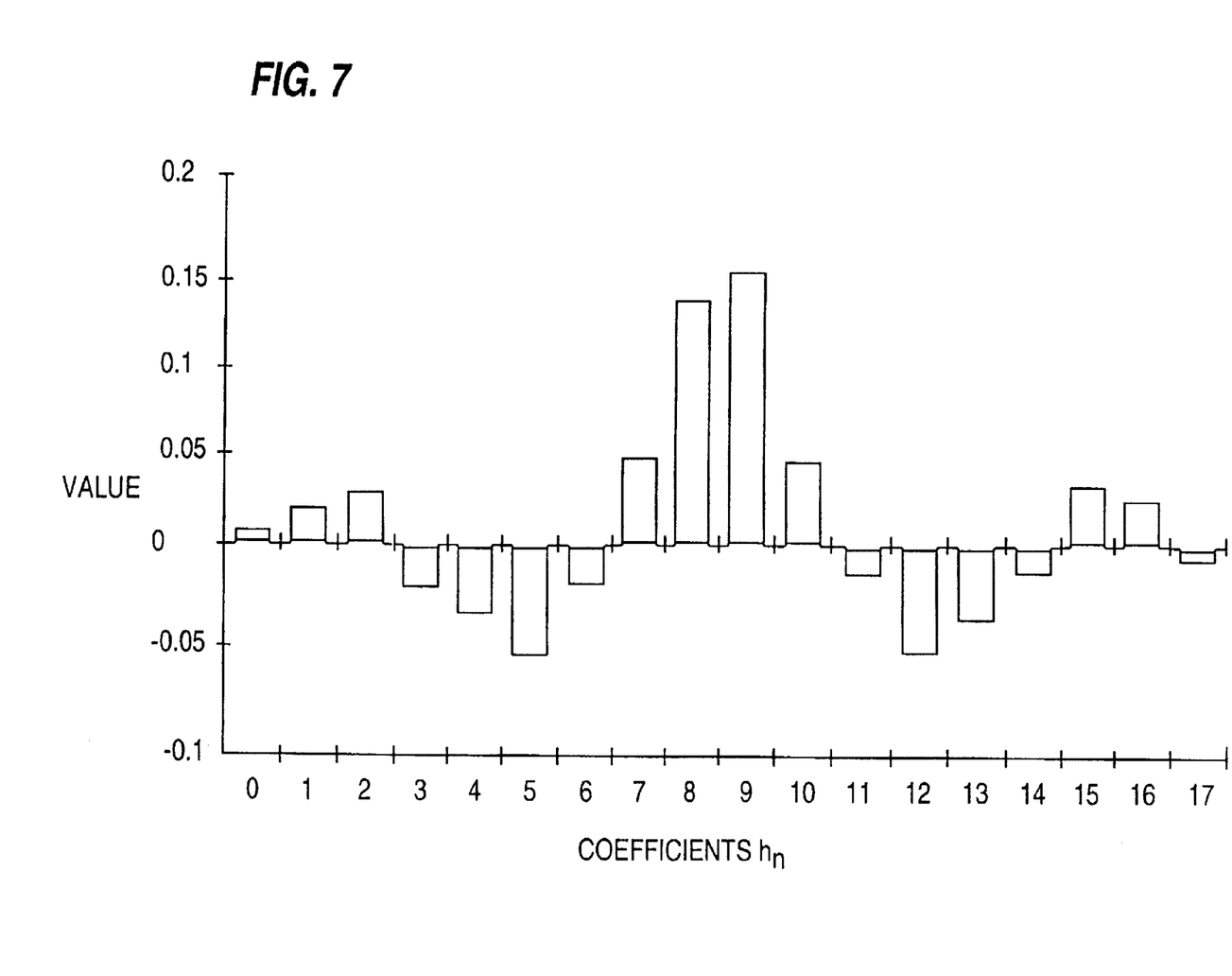
FIG. 7 is a graph showing the coefficients of the digital filter after the variation of the coefficients has been done.

In FIG. 7, an example of an optimized set of coefficients $h_m$ of the digital filter 16 is shown. The coefficients are configured asymmetrically with respect to the center point or to the vertical center line. Phase distortions of the received signal that are caused by the receiving element 4 are eliminated by the asymmetrical component of the coefficients $h_m$.

The symmetrical component of the coefficients $h_m$ eliminate amplitude distortions in the received signal that are caused by the finite diameter of the transmitted light beam 8 and by the receiving element 4.

Figure 8:
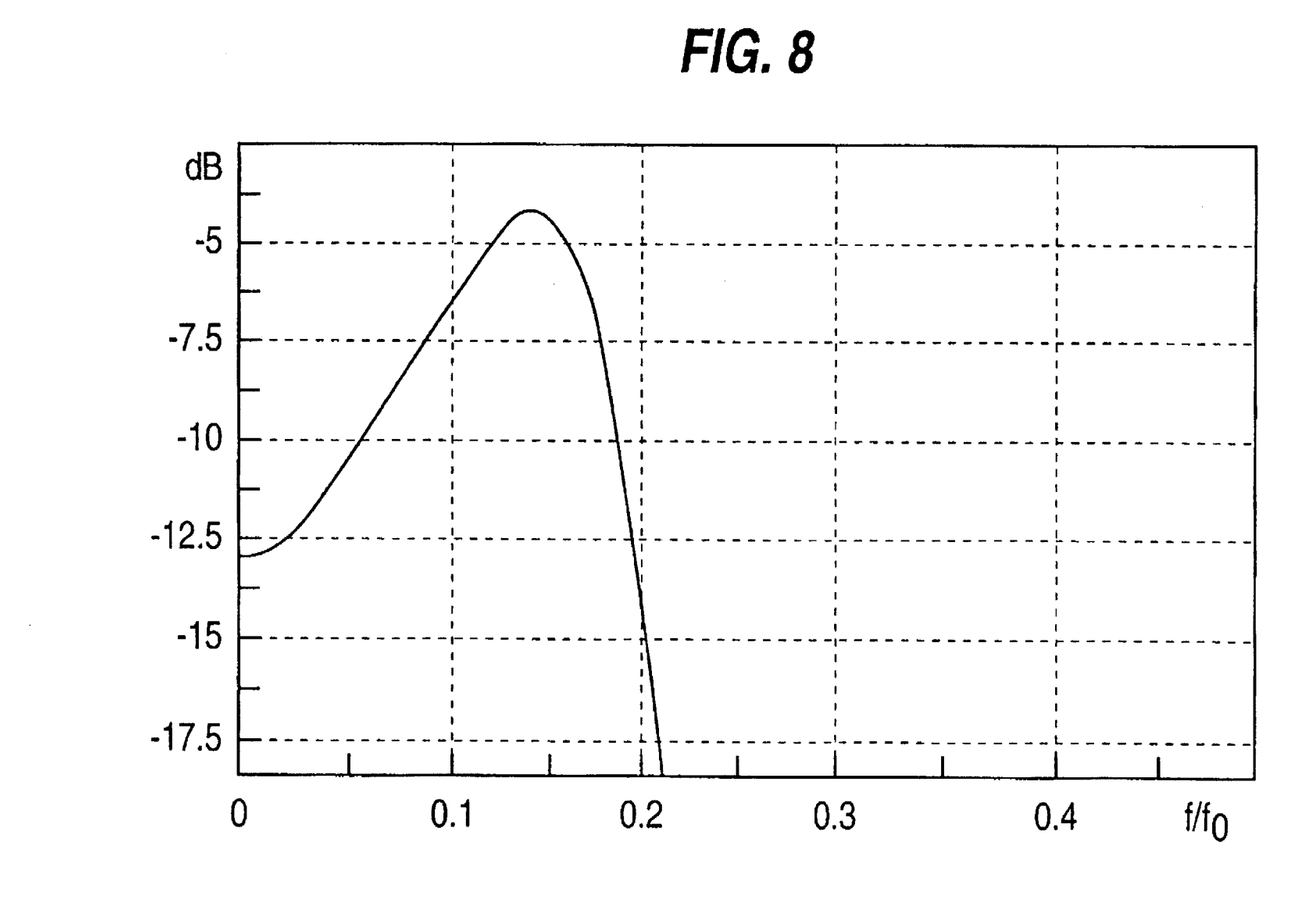
FIG. 8 is a graph showing the transmission function of the optimized digital filter.

In FIG. 8, the transmission function of the digital filter 16 that results from the Fourier transform of the coefficients of the digital filter 16 in accordance with FIG. 7 is shown. In the present exemplary embodiment, the frequency is $f_n=10$ MHz.

The transmission function is essentially equivalent to the inverse of the frequency spectrum of the spatial distribution of the transmitted light beam 8, which essentially has a Gaussian characteristic. Deviations from this are due to signal distortions caused by the receiving element 4.

This means that by the experimental detection of all the external system variables over the entire frequency range, their influence on the received signal can be detected accurately and eliminated by the variation process.

Following optimization of the coefficients $h_m$ of the digital filter 16, the computer unit is disconnected from the device 1. During operation of the device 1, the optimized set of coefficients $h_m$ of the digital filter 16 is kept unchanged. There is no need to readjust the coefficients $h_m$ of the digital filter 16 and hence the transmission function, especially whenever the coefficients $h_m$ are optimized for different reading distances d and bar code symbols 2.

We claim:

1. An optoelectronic device for recognizing a mark having a defined contrast pattern, comprising:

a transmitting element for emitting a beam of transmitted light that is passed over the mark, the transmitted light beam having a spatial distribution of intensity and a corresponding frequency spectrum at a location of the mark;

a receiving element for receiving a received beam of light reflected from the mark and producing an analog received signal which exhibits an amplitude modulation dependent on the contrast pattern of the mark and on the spatial distribution of intensity of the transmitted light beam at the location of the mark;

an n-bit analog-to-digital converter having a word width (n) greater than one connected to the receiving element for receiving the analog received signal and converting the analog received signal into a digital received signal; and a digital filter connected to the n-bit analog-to-digital converter for receiving the digital received signal and having a transmission characteristic which is essentially equivalent to an inverse of a frequency spectrum of the spatial distribution of intensity of the transmitted light beam at the location of the mark for outputting a digital signal that has transition points corresponding to transition points in the contrast pattern of the mark.

2. The device of claim 1, wherein the transmission characteristic of the digital filter, within a predetermined tolerance range, is equivalent to the inverse of the frequency spectrum of the spatial distribution of intensity of the transmitted light beam for a predetermined range of a distance of the mark from the device.

3. The device of claim 1, wherein the transmission characteristic of the digital filter additionally compensates for inference due to a signal-distorting component by including defined deviations from the inverse of the frequency spectrum of the spatial distribution of the intensity of the transmitted light beam which are equivalent to the inverse functions of the transmission functions of the signal-distorting component.

4. The device of claim 3, wherein the receiving element comprises the signal-distorting component.

5. The device of claim 1, wherein the digital filter comprises an FIR filter with an adjustable coefficient.

6. The device of claim 5, wherein the FIR filter is an eighteenth degree filter.

7. The device of claim 1, wherein the word width of the n-bit analog-to-digital converter is within a range of $8 \leq n \leq 12$.

8. The device of claim 1, wherein the device comprises a bar code reader; the transmitting element includes a deflector unit and a transmitter comprised of a laser which is arranged so that the transmitted light beam is deflected by the deflector unit onto the mark; and the receiving element includes a photodiode for receiving the received signal and producing the analog received signal, and an amplifier connected to the photodiode for amplifying the analog received signal.

9. A method for reducing signal distortion for the optoelectronic device according to claim 3, comprising:

modeling the total system of the optoelectronic device including the frequency spectrum of the spatial distribution of intensity of the transmitted light beam and the transmission function of the signal-distorting component and of the digital filter;

experimentally determining a decoding reliability of the device as a function of a reading distance d of the mark from the device for a specific presetting of the digital filter, wherein the decoding reliability is the degree of matching of amplitude modulation of the received signal with the contrast pattern of mark; and varying adjustable coefficients of the digital filter at a predetermined transmission function of signal-distorting components and at a predetermined frequency spectrum of the spatial distribution of intensity of the transmitted light beam until the decoding reliability has exceeded a predetermined threshold value.

10. The method of claim 9, wherein the varying step includes setting one of the coefficients of the digital filter to a value of one and setting all remaining coefficients to a value of zero as a starting condition.

11. The method of claim 9, wherein the varying step includes varying the coefficients by a method of design centering.

12. The method of claim 9, wherein the varying step includes varying the coefficients of the digital filter for a predetermined reading distance d of the mark from the device and for a predetermined contrast pattern of the mark.

13. The method of claim 9, wherein the varying step includes varying the coefficients of the digital filter for a plurality of reading distances d, located within a predetermined range, and for various contrast patterns, until the decoding reliability has exceeded a predetermined threshold value for each of the distance values and for each contrast pattern.

14. The method of claim 9, wherein the determining step includes determining values for the decoding reliability in the device.

15. The method of claim 9, wherein the modeling step includes experimentally ascertaining the transmission function of the signal-distorting component.

16. The method of claim 9, wherein the signal-distorting component comprises a plurality of signal-distorting components, and the modeling step includes experimentally ascertaining the transmission function of the plurality of signal-distorting components and is carried out so that the transmission function of the signal-distorting components is predetermined within a predetermined bandwidth in the model of the total system, with the predetermined bandwidth corresponding to deviations from one component to another.

* * * * *